United States Patent [19]
Lashkajani

[11] Patent Number: 5,965,177
[45] Date of Patent: Oct. 12, 1999

[54] METHOD FOR PRODUCING A CLOUDING AGENT

[76] Inventor: Hadi B. Lashkajani, 1311 Scottland Dr., Lakeland, Fla. 33813

[21] Appl. No.: 08/968,331

[22] Filed: Nov. 12, 1997

[51] Int. Cl.[6] ............................... A23L 2/06; A23L 2/62
[52] U.S. Cl. ............................... 426/51; 426/50; 426/52; 426/599; 426/495
[58] Field of Search ............................... 426/50, 51, 52, 426/599, 521, 495

[56] References Cited

U.S. PATENT DOCUMENTS

| | | | |
|---|---|---|---|
| 3,660,105 | 5/1972 | Kesterson et al. | 99/28 |
| 4,301,719 | 11/1981 | Gerow | 99/510 |
| 4,335,143 | 6/1982 | Wiener et al. | 426/50 |
| 5,202,142 | 4/1993 | Gresh | 426/330.3 |
| 5,286,511 | 2/1994 | Klavons et al. | 426/577 |

*Primary Examiner*—Keith D. Hendricks
*Attorney, Agent, or Firm*—A. W. Fisher III

[57] ABSTRACT

A method of producing a clouding agent from citrus membrane and/or peel for use in fruit juices and soft drink beverages comprising the sequential steps of mincing or chopping the citrus membrane and/or peel, forming a slurry of water and the minced or chopped citrus membrane and/or peel, pasteurizing the slurry of water and minced or chopped citrus membrane and/or peel to deactivate the constitutive enzymes, heating the slurry of water and minced or chopped citrus membrane and/or peel to deactivate/destroy the enzymes and bacteria, mixing pectolytic and/or cellulytic enzymes into the slurry of water and minced or chopped citrus membrane and/or peel, separating the citrus cellular debris from the slurry of water and minced or chopped citrus membrane and/or peel to produce a liquid effluent of clouding material with a range of particle sizes compatible with stable suspensions, pasteurizing the liquid effluent of clouding material to deactivate/destroy the pectolytic and/or cellulytic enzymes and concentrating the liquid effluent of clouding material to form the clouding agent.

5 Claims, No Drawings

METHOD FOR PRODUCING A CLOUDING AGENT

BACKGROUND OF THE INVENTION

1. Field of the Invention

A method of producing a clouding agent from citrus membrane and/or peel for use in fruit juices and soft drink beverages.

2. Description of Prior Art

Consumers expect fruit juices and beverages to be cloudy rather than clear. Cloudy beverages and soft drinks achieve cloudiness by adding a natural or chemical ingredient such as titanium dioxide or brominated vegetable oil. Usually these substances are not in citrus beverages and the use of brominated vegetable oil has been regulatorily curtailed. Curtailment has resulted in a need to find a substitute beverage cloud.

All citrus juices, when freshly expressed, have a characteristic opacity of cloudiness. It is obviously desirable to maintain this opacity in processing citrus juices, and to emulate it in formulated citrus beverages. In the natural juices, "cloud" is provided by minute suspended or colloidal particles of citrus tissue and cell contents.

In formulated beverages, cloudiness is achieved by adding a suitable natural or chemical substance, such as titanium dioxide or brominated vegetable oil. Usually these substances are alien to citrus beverages. In keeping with the current consumer emphasis on natural ingredients, several efforts have been directed toward developing a clouding agent from citrus peel or citrus albedo.

U.S. Pat. No. 4,388,330 relates to the cloud stability of citrus juice beverages and beverage bases by subjecting pasteurized concentrated or single strength citrus juice to at least one enzyme having protease activity. The juice may be pretreated mechanically or enzymatically to enhance protease activity prior to or simultaneously with treatment with at least one enzyme having protease activity.

U.S. Pat. No. 3,647,475 teaches a cloud fortified citrus fruit juice product adding a quantity of finely divided albedo, or inner white layer of the rind or peel of the citrus fruit from which the outer flavedo layer containing the oil has been removed to an extracted fruit juice.

WO 94/27451 shows a process for preparing natural thickeners derived from citrus fruit for beverages. The process comprises the steps of preparing a slurry of water and citrus pulp, heating the slurry and subjecting the slurry to high shear.

FR 2,590,123 teaches a product able to produce a stable, turbid phase in fruit juices from the complete peel of a citrus fruit or only the albedo portion of the peel by bleaching in presence of citric acid.

U.S. Pat. No. 2,556,579 discloses a process for the treatment of citrus peel by subjecting the peel to disintegrating and wet washing operations to remove the bulk of bitter skin components and to provide a hydrous pulp for further treatment, heating the material while subjected it to a partial vacuum with agitation, adding sugar to the material and then subjecting the material to milling to disperse pockets of bitter components.

U.S. Pat. No. 4,335,143 shows a process for producing a dried albedo clouding agent which does not impart off-flavors to the beverage. The process involves heating albedo-containing material which is then ground and treated with a macerating enzyme. The enzyme is then inactivated and coarse particles are filtered out and discarded. The filtrate is centrifuged to obtain the clouding agent which is then washed with water, isopropyl alcohol or a combination of the two. The clouding agent is dried to obtain a stable product compatible with dry beverage formulas for citrus-type beverages.

U.S. Pat. No. 3,404,990, discloses a procedure whereby citrus peels are comminuted, heated and then enzyme treated to facilitate the extraction of clouding material. The entire mixture is briefly centrifuged to remove the pulp and the supernatant liquid is pasteurized. Excess water is then evaporated. The final clouding agent product is a liquid concentrate.

FR 2,331,292 describes a procedure which is basically similar, but the citrus albedo is sieved, milled and homogenized in such a way as to minimize the amount of pulp discarded, and no enzyme is added. The final clouding agent is a liquid concentrate which has the consistency of fresh cream.

Matthews, Herrera and Crandall of the University of Florida have recently developed a procedure wherein a clouding agent is obtained from the water which has been used to leach citrus peel during pectin or dietary fiber production. The final clouding agent is a liquid concentrate differing from the previous examples in that it is free of pectin and contains soluble carbohydrates as the major component.

Further examination of the literature leads to the conclusion that all prior procedures ultimately produce a liquid concentrate which consists of cloud particles and varying amounts of soluble carbohydrates, and with the exception of the Matthews procedure pectinaceous material. Bradock and Kesterson, from the University of Florida, have evaluated typical prior art clouding agents in their article "use of Enzymes in Citrus Processing" Food Technology, November 1979. They report that the cloud may be quite bitter; the cloud concentrate has a tendency to brown or darken with storage; and the clouding ability of the concentrate varies with each batch of peel, which would make standardization of the cloud level in the final beverage extremely difficult.

Additional examples of the prior art are found in U.S. Pat. No. 2,935,407; U.S. Pat. No. 3,112,202; U.S. Pat. No. 3,660,105; U.S. Pat. No. 4,371,552; U.S. Pat. No. 5,202,142; RU 2,004,162; FR 2,520,983 and JP 59-162,860.

SUMMARY OF THE INVENTION

The present invention relates to a method of producing a natural clouding agent from citrus membrane and/or peel for use in fruit juice and soft drink beverages to obtain the desired degree of opacity without a deleterious effect on flavor.

Specifically, the method or process for producing the natural clouding agent of the instant invention comprises the sequential steps of mincing or chopping the citrus membrane and/or peel to a predetermined size of about one-quarter inch, adding water to the minced or chopped citrus membrane and/or peel in a predetermined ratio of about 2 to 1 by weight to form a slurry of water and the clouding material, agitating the slurry in a mixing tank, pasteurizing the agitated slurry to deactivate the constitutive enzymes, heating the pasteurized slurry for a predetermined period of time of about one minute at a predetermined temperature of approximately 190° F. to destroy the enzymes and bacteria, cooling the slurry to a predetermined temperature of from approximately 125° F. to approximately 128° F., mixing pectolytic and/or cellulytic enzymes with the slurry at a predetermined temperature of from approximately 120° F. to approximately 125° F. for a predetermined period of time of about 30 minutes to stabilize the clouding material within the slurry, separating the citrus cellular debris from the slurry to produce a liquid effluent of the clouding material within a predetermined range of particle sizes compatible with stable suspensions proper charge distribution/stabilization and maximum turbidity values, pasteurizing the liquid effluent of clouding material at a predetermined temperature of approximately 180° F. to deactivate/destroy the pectolytic and/or cellulytic enzymes and concentrating the liquid effluent of clouding material to form the clouding agent.

The invention accordingly comprises the features of construction, combination of elements, and arrangement of parts which will be exemplified in the construction hereinafter set forth, and the scope of the invention will be indicated in the claims.

DETAILED DESCRIPTION OF THE PREFERRED EMBODIMENT

The present invention relates to a method of producing a natural clouding agent from citrus membrane and/or peel for use in fruit juice and soft drink beverages that overcomes the problems of bitterness and batch consistency generally found in previous processes. The clouding agent is flavorless in beverages making it possible to obtain the desired degree of opacity without a deleterious effect on flavor.

In general, the method or process for producing the natural clouding agent of the instant invention comprises the sequential steps of mincing or chopping the citrus membrane and/or peel to a predetermined size, adding water to the minced or chopped citrus membrane and/or peel in a predetermined ratio to form a slurry of water and the clouding material, agitating the slurry in a mixing tank, pasteurizing the agitated slurry to deactivate the constitutive enzymes, heating the pasteurized slurry for a predetermined period of time at a predetermined temperature to deactivate/destroy the enzymes and bacteria, cooling the slurry to a predetermined temperature, mixing pectolytic and/or cellulytic enzymes with the slurry at a predetermined temperature for a predetermined period of time to stabilize the clouding material within the slurry, separating the citrus cellular debris from the slurry to produce a liquid effluent of the clouding material within a predetermined range of particle sizes compatible with stable suspensions, proper charge distribution/stabilization and maximum turbidity values, pasteurizing the liquid effluent of clouding material at a predetermined temperature to deactivate/destroy the pectolytic and/or cellulytic enzymes and concentrating the liquid effluent of clouding material to form the clouding agent.

More particularly, citrus pulp, pomace, pulpwash liquor and/or peel is chopped or minced into pieces or bits of approximately one-quarter inch by a hammer mill or other suitable cutting/chopping device. These small bits or pieces of citrus clouding material are mixed with hot water in a ratio by weight of about 1 to 2 to form a slurry of water and the citrus clouding material. The slurry is pumped through a shell and tube pasteurizer to deactivate the constitutive native enzymes present in the slurry. The slurry is then heated at approximately 190° F. for about three minutes to ensure the destruction of the enzymes and bacteria. The slurry is cooled to from approximately 125° F. to approximately 128° F.

The slurry is fed to at least one enzyme mixing tank and mixed with pectolytic and/or and cellulytic enzymes at from approximately 120° F. to approximately 125° F. for about 30 minutes.

The bits or pieces of citrus clouding material or particles are separated from the large pieces of citrus cellular debris and the like by centrifuge and filtration and collected as a liquid effluent to provide proper particle size compatible with stable suspensions, proper charge distributions/stabilization and maximum turbidity values.

The collected liquid effluent of citrus clouding material is pumped to a surge tank and pasteurized at approximately 180° F. to deactivate/destroy the pectolytic and/or cellulytic enzymes. Finally, the liquid effluent of citrus clouding material is cooled to a low temperature by an evaporator to increase the concentration to about 50 Brix. The concentrated clouding agent is stored at approximately 20° F.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A method of producing a clouding agent from citrus pulp, pomace, pulpwash liquor and/or peel for use in fruit juices and soft drink beverages comprising the sequential steps of mincing or chopping the citrus pulp, pomace, pulpwash liquor and/or peel, forming a slurry of water and the minced or chopped citrus pulp, pomace, pulpwash liquor and/or peel, pasteurizing the slurry to deactivate the constitutive enzymes, heating the slurry to approximately 190° F. for about one minute to destroy the constitutive enzymes and bacteria, cooling the slurry to a temperature in the range of approximately 125° F. to approximately 128° F., mixing pectolytic and/or cellulytic enzymes into the slurry at a temperature in the range from approximately 120° F. to approximately 125° F. for about 30 minutes to stabilize the clouding material within the slurry, separating the citrus cellular debris from the slurry to produce a liquid effluent of clouding material consisting of said citrus pulp, pomace, pulpwash liquor and/or peel and pasteurizing the liquid effluent of clouding material consisting of said citrus pulp, pomace, pulpwash liquor and/or peel at a temperature of approximately 180° F. to destroy the pectolytic and/or cellulytic enzymes and concentrating the liquid effluent of clouding material to form the clouding agent.

2. The method of producing a clouding agent from citrus pulp, pomace, pulpwash liquor and/or peel for use in fruit juices and soft drink beverages of claim 1 wherein the citrus pulp, pomace, pulpwash liquor and/or peel is minced or chopped to approximately one-quarter inch in size and the slurry of water and the minced or chopped citrus pulp, pomace, pulpwash liquor and/or peel is in a ratio of about 2 to 1 by weight.

3. The method of producing a clouding agent from citrus pulp, pomace, pulpwash liquor and/or peel for use in fruit juices and soft drink beverages of claim 2 wherein the particle size of the liquid effluent is compatible with stable suspensions, charge distribution/stabilization and maximum turbidity values.

4. The method of producing a clouding agent from citrus pulp, pomace, pulpwash liquor and/or peel for use in fruit juices and soft drink beverages of claim 1 wherein the particle size of the liquid effluent is compatible with stable suspensions, charge distribution/stabilization and maximum turbidity values.

5. The method of producing a clouding agent from citrus pulp, pomace, pulpwash liquor and/or peel for use in fruit juices and soft drink beverages of claim 4 wherein the citrus pulp, pomace, pulpwash liquor and/or peel is minced or chopped to approximately one-quarter inch in size and the slurry of water and the minced or chopped citrus pulp, pomace, pulpwash liquor and/or peel is in a ratio of about 2 to 1 by weight.

\* \* \* \* \*